United States Patent [19]

Morita et al.

[11] Patent Number: 5,548,396
[45] Date of Patent: Aug. 20, 1996

[54] METHOD AND APPARATUS FOR MEASURING ECCENTRICITY OF ASPHERICAL LENS HAVING AN ASPHERICAL SURFACE ON ONLY ONE LENS FACE

[75] Inventors: Nobuhiro Morita, Yokohama; Takeshi Tada, Isehara, both of Japan

[73] Assignee: Ricoh Company, Ltd., Tokyo, Japan

[21] Appl. No.: 280,614

[22] Filed: Jul. 26, 1994

[30] Foreign Application Priority Data

Aug. 13, 1993 [JP] Japan .................................... 5-201588
Oct. 18, 1993 [JP] Japan .................................... 5-259966

[51] Int. Cl.⁶ ...................................................... G01B 9/00
[52] U.S. Cl. ...................................................... 356/127
[58] Field of Search ................................... 356/124, 127

[56] References Cited

U.S. PATENT DOCUMENTS 5,349,433  9/1994  Iwane ..................................... 356/127

FOREIGN PATENT DOCUMENTS 4202955   8/1992  Germany ............................. 356/127
61-118639 6/1986  Japan .................................. 356/124
61-144541 7/1986  Japan .
3-037544  2/1991  Japan .................................. 356/124
5-196540  8/1993  Japan .
5-215636  8/1993  Japan .
5-340838 12/1993  Japan .
6-137993  5/1994  Japan .................................. 356/124

Primary Examiner—Frank Gonzalez
Assistant Examiner—Jason D. Eisenberg
Attorney, Agent, or Firm—Oblon, Spivak, McClelland, Maier & Neustadt, P.C.

[57] ABSTRACT

In a method and an apparatus for measuring eccentricity of an aspherical lens, a detected lens as the aspherical lens is supported by a holding device and is rotated by a driving device around a rotating axis approximately conforming to an optical axis of the detected lens. Light is irradiated from a light source to the detected lens through a beam splitter and an optical system. Light reflected on the detected lens is reversely transmitted through the optical system and is focused and formed as a spot image. A pressing face of an alignment adjusting device is arranged in a position separated from the optical axis by a radius of the detected lens. The pressing face pushes an outer circumferential edge of the detected lens deflected outward by rotating the detected lens. Thus, the pressing face moves the detected lens and coarsely adjusts a position of the detected lens by approximately conforming the optical and rotating axes to each other. Thus, the spot image of the reflected light can be formed on an image forming face. Another method and another apparatus for measuring eccentricity of an aspherical lens are also shown.

13 Claims, 8 Drawing Sheets

METHOD AND APPARATUS FOR MEASURING ECCENTRICITY OF ASPHERICAL LENS HAVING AN ASPHERICAL SURFACE ON ONLY ONE LENS FACE

BACKGROUND OF THE INVENTION

1. Field of the Invention

The present invention relates to a method and an apparatus for measuring eccentricity of an aspherical lens having an aspherical surface on only one lens face. More particularly, the present invention relates to a method and an apparatus for measuring an angle between an optical axis of the aspherical lens having an aspherical surface on only one lens face and an axis of the aspherical surface.

2. Description of the Related Art

When an aspherical lens is constructed by a spherical surface on one lens face and an aspherical surface on another lens face, an optical axis of the aspherical lens is a connecting line between a center of curvature of the spherical surface and a center of curvature of a reference spherical surface as a base of the aspherical surface. An axis of the aspherical surface is a connecting line between the center of curvature of the reference spherical surface and an vertex of the aspherical surface. If the aspherical lens is manufactured as designed, the optical axis of the aspherical lens is completely in conformity with the axis of the aspherical surface.

However, such a lens cannot be really manufactured. In reality, a shift called eccentricity is slightly caused between the lens optical axis and the aspherical surface axis. Accordingly, when the aspherical lens is manufactured, it is necessary to measure eccentricity of this aspherical lens.

Some apparatuses for measuring eccentricity of the aspherical lens are generally proposed on the basis of such requirements.

In a measuring apparatus shown in Japanese Patent Application Laying Open (KOKAI) No. 3-37544, a detected lens as an aspherical lens is attached to a lens holder. A laser beam is irradiated onto the detected lens in a rotating axis direction thereof by approximately rotating the detected lens around an optical axis thereof. Thus, while a reflected spot image from the detected lens is monitored, the detected lens is moved in a direction perpendicular to the rotating axis thereof. A setting shift of the detected lens is corrected such that the rotating and optical axes of the detected lens are in conformity with each other. Thereafter, eccentricity of the detected lens is measured.

In addition to this measuring apparatus, various kinds of eccentricity measuring apparatuses are also proposed. However, in each of these eccentricity measuring apparatuses, the setting shift must be corrected such that the rotating and optical axes of the detected lens are in conformity with each other. Further, a high accuracy of about 1 μm is required in this correction to secure a measuring accuracy in eccentricity.

Accordingly, skill is required for an operation for correcting the setting shift of the detected lens and it takes much time to perform this correcting operation.

SUMMARY OF THE INVENTION

It is therefore a first object of the present invention to provide a method and an apparatus for easily performing a setting operation including a coarse adjustment of a detected lens when eccentricity between the optical axis of an aspherical lens and the axis of an aspherical surface is measured.

A second object of the present invention is to provide a method and an apparatus for easily measuring eccentricity of an aspherical lens for a short time without performing any difficult operation for correcting a setting shift of this lens.

In accordance with a first construction of the present invention, the above first object can be achieved by a method for measuring eccentricity of an aspherical lens and having a process in which a detected lens having an aspherical surface on only one lens face is rotated around a rotating axis approximately conforming to an optical axis of the detected lens;

light is irradiated onto the detected lens in a direction of the rotating axis and reflected light from the detected lens is focused and formed as a spot image on an image forming face of an optical system; and a shift between the optical axis and the rotating axis of the detected lens and a direction of this shift are detected by the size of a circle drawn by the spot image when the detected lens is rotated;

the eccentricity measuring method measuring eccentricity between an axis of the aspherical surface and the optical axis and comprising the steps of:

forming a pressing face for pushing and moving the detected lens in a direction approximately perpendicular to the optical axis in a state in which the pressing face comes in contact with an outer circumferential edge of the detected lens;

arranging the pressing face in a position separated from the optical axis by a radius of the detected lens before the spot image is focused and formed on the image forming face; and coarsely adjusting a position of the detected lens.

In accordance with a second construction of the present invention, the above first object can be also achieved by a method for measuring eccentricity of an aspherical lens and having a process in which a detected lens having an aspherical surface on only one lens face is rotated around a rotating axis approximately conforming to an optical axis of the detected lens;

light is irradiated from a light source onto the detected lens in a direction of the rotating axis and reflected light from the detected lens is focused and formed as a spot image on an image forming face of an optical system; and a shift between the optical axis and the rotating axis of the detected lens and a direction of this shift are detected by the size of a circle drawn by the spot image when the detected lens is rotated;

the eccentricity measuring method measuring eccentricity between an axis of the aspherical surface and the optical axis and comprising the steps of:

fixing the light source, the optical system and the image forming face onto the same stage; and forming the spot image on the image forming face by moving the stage forward and backward in a direction of the optical axis.

In accordance with a third construction of the present invention, the above first object can be also achieved by a method for measuring eccentricity of an aspherical lens and having a process in which a detected lens having an aspherical surface on only one lens face is rotated around a rotating axis approximately conforming to an optical axis of the detected lens;

light is irradiated from a light source onto the detected lens in a direction of the rotating axis and reflected light from the detected lens is focused and formed as a spot image on an image forming face of an optical system; and a shift between the optical axis and the rotating axis of the detected lens and a direction of this shift are detected by the size of a circle drawn by the spot image when the detected lens is rotated;

the eccentricity measuring method measuring eccentricity between an axis of the aspherical surface and the optical axis and comprising the steps of:

detecting the shift between the optical axis and the rotating axis and the shifting direction by arithmetic means; and correcting the shift by the arithmetic means by moving the detected lens in a direction perpendicular to the optical axis on the basis of shape data of the detected lens inputted to the arithmetic means in advance.

In accordance with a fourth construction of the present invention, the above first object can be also achieved by an apparatus for measuring eccentricity of an aspherical lens, comprising:

means for holding a detected lens having an aspherical surface on only one lens face;

driving means for rotating the holding means around a rotating axis approximately overlapping an optical axis of the detected lens;

an angle sensor for detecting a rotating angle of the detected lens;

a light source for irradiating light onto the detected lens in a direction of the rotating axis;

an optical axis for focusing and forming a spot image of reflected light from the detected lens;

means for detecting a position of the spot image and arranged on an image forming face of the optical system;

displacement measuring means for really measuring a deflection of a detected face of the detected lens in a direction of the optical axis; and a pressing face for moving the detected lens in a direction perpendicular to the optical axis in a state in which the pressing face comes in contact with an outer circumferential edge of the detected lens;

the pressing face being arranged in a position separated from the optical axis by a radius of the detected lens.

In accordance with a fifth construction of the present invention, the above first object can be also achieved by an apparatus for measuring eccentricity of an aspherical lens, comprising:

means for holding a detected lens having an aspherical surface on only one lens face;

driving means for rotating the holding means around a rotating axis approximately overlapping an optical axis of the detected lens;

an angle sensor for detecting a rotating angle of the detected lens;

a light source for irradiating light onto the detected lens in a direction of the rotating axis;

an optical axis for focusing and forming a spot image of reflected light from the detected lens;

means for detecting a position of the spot image and arranged on an image forming face of the optical system;

displacement measuring means for really measuring a deflection of a detected face of the detected lens in a direction of the optical axis; and driving means for fixing the light source, the optical system and the spot position detecting means onto the same stage and moving the stage forward and backward along the optical axis of the detected lens.

In accordance with a sixth construction of the present invention, the measuring apparatus further comprises stage position detecting means for detecting a position of the stage on the optical axis; and arithmetic means for controlling an operation of the driving means of the stage. The arithmetic means performs feedback control of the moving means based on shape data of the detected lens, data of the optical system and stage position data from the stage position detecting means.

In the above constructions, the detected lens is rotated around a rotating axis approximately conforming to the optical axis. At this time, if the rotating and optical axes are shifted from each other, an outer circumferential edge of the detected lens is also deflected or displaced in a direction perpendicular to the optical axis in accordance with the rotation of the detected lens. Therefore, a pressing face of an alignment adjusting means is formed in a position separated from the optical axis by a radius of the detected lens. The pressing face presses the detected lens and prevents the outer circumferential edge from being displaced in accordance with the rotation of the detected lens so that the detected lens is moved toward the optical axis as a center. As the detected lens is rotated, the position of the detected lens is coarsely adjusted. Thus, the shift between the rotating axis and the optical axis is reduced so that the spot image can be focused and formed on the image forming face.

Light is first irradiated onto a rotating aspherical surface in the optical axis direction to form the spot image on the image forming face. The stage is then moved forward and backward in the optical axis direction to determine a position of the stage such that the irradiated light is converged by the optical system to a paraxial curvature center of the aspherical surface. If the position of the stage is determined, the spot image can be formed on the image forming face at any time since the optical system, the light source and the image forming face are fixed to the stage and are held in a constant relation in position.

At this time, the optical system can be automatically positioned by calculating a moving distance of the stage by an arithmetic unit from shape data of the detected lens and data of the optical system.

When the spot image is formed on the image forming face and the detected lens is rotated, the spot image draws a circle as mentioned above if the rotating and optical axes are not in conformity with each other. However, when the aspherical surface is a convex or concave face, a shifting direction of the spot image and an eccentric direction of the detected lens are in conformity with each other, or are different from each other by 180°. Therefore, an outermost projecting position of the outer circumferential edge of the detected lens is calculated from a shift in the spot image in consideration of convex or concave data of the aspherical surface. This projecting portion is pressed by the alignment adjusting means in accordance with a shifting amount of the spot image so that the rotating and optical axes can be in conformity with each other.

In accordance with an eighth construction of the present invention, the above second object can be achieved by a method for measuring eccentricity of an aspherical lens, comprising the steps of:

rotating a detected lens having an aspherical surface on only one lens face around a rotating axis approximately conforming to an optical axis of the detected lens;

irradiating light onto the detected lens in a direction of the rotating axis;

focusing and forming reflected light from the detected lens as a spot image on an image forming face of an optical system;

detecting a shift between the optical axis and the rotating axis by the size of a circle drawn by the spot image when the detected lens is rotated;

setting a reference position in an outer circumference of the detected lens;

calculating a direction of the shift from an angle formed between a line connecting the reference position and a rotating center of the detected lens to each other and a line connecting the spot image and the rotating center of the detected lens to each other;

really measuring a deflection of the aspherical surface caused by rotating the detected lens in an optical axis direction;

calculating a correction value of the deflection from the size of the circle and the shifting direction; and calculating eccentricity between the optical axis and an aspherical surface axis by subtracting the correction value from the deflection really measured.

In accordance with a ninth construction of the present invention, the measuring method further comprises the steps of:

displacing the detected lens in a direction approximately perpendicular to the optical axis of the detected lens;

calculating the deflection of the aspherical surface caused by this displacement in the optical axis direction;

calculating a changing amount of the shift between the optical and rotating axes of the detected lens; and calculating the correction value by using a ratio of the changing amount of the shift and an amount of the deflection.

In accordance with a tenth construction of the present invention, the eccentricity of the aspherical surface is corrected by calculating the deflection of the aspherical surface in the optical axis direction from a shape parameter of the detected lens when an angle between the optical and rotating axes of the detected lens is changed by $\phi$.

In accordance with an eleventh construction of the present invention, the above second object can be also achieved by an apparatus for measuring eccentricity of an aspherical lens, comprising:

means for holding a detected lens having an aspherical surface on only one lens face;

driving means for rotating the holding means around a rotating axis approximately conforming to an optical axis of the detected lens;

an angle sensor for detecting a rotating angle of the detected lens;

a light source for irradiating light to the detected lens in a rotating axis direction;

an optical system for focusing and forming reflected light from the detected lens as a spot image;

means for detecting a position of the spot image and arranged in an image forming position of the optical system;

displacement measuring means for really measuring the deflection of a detected face of the detected lens in an optical axis direction; and arithmetic means for calculating a correction value with respect to a deflecting value really measured by the displacement measuring means from a shift between the rotating axis and the optical axis of the detected lens and a direction of this shift detected by the spot position detecting means and the angle sensor.

In accordance with a twelfth construction of the present invention, the measuring apparatus further comprises an actuator for moving the detected lens forward and backward in a direction approximately perpendicular to the optical axis of the detected lens.

In accordance with a thirteenth construction of the present invention, the actuator displaces the detected lens by the correction value calculated by the arithmetic means in the direction approximately perpendicular to the optical axis in cooperation with the arithmetic means, the displacement measuring means and the actuator.

The holding means for holding the detected lens rotates the detected lens around a rotating axis approximately conforming to the optical axis of the detected lens. Light is irradiated onto the detected lens in a direction of the rotating axis. Light reflected on a surface of the detected lens is focused and formed as a spot image by the optical system on an image forming face thereof. If no optical and rotating axes of the detected lens are in conformity with each other, the spot image draws a circle by rotating the detected lens. A theoretical deflection of an aspherical surface in an optical axis direction caused by rotating the detected lens can be calculated from a radius R of this circle and an angle $\beta$ formed between a reference position and the spot image at a center of rotation of the detected lens. A real value of this deflection is measured by the displacement measuring means. A deflection caused by eccentricity is calculated by subtracting the theoretical deflection from the really measured deflection value. Eccentricity of the aspherical lens can be calculated from this calculated deflection by a well-known method. Accordingly, the eccentricity of the aspherical lens can be easily measured for a short time without correcting a setting operation of the detected lens.

The detected lens may be displaced by a correction value calculated by the arithmetic means in a direction approximately perpendicular to the optical axis in cooperation with the arithmetic means, the displacement measuring means and the actuator. In this case, a setting shift of the detected lens can be automatically corrected and eccentricity of the detected lens can be simply measured without requiring skill.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a method and an apparatus for measuring eccentricity of an aspherical lens in the present invention will next be described in detail with reference to the accompanying drawings.

Figure 1:
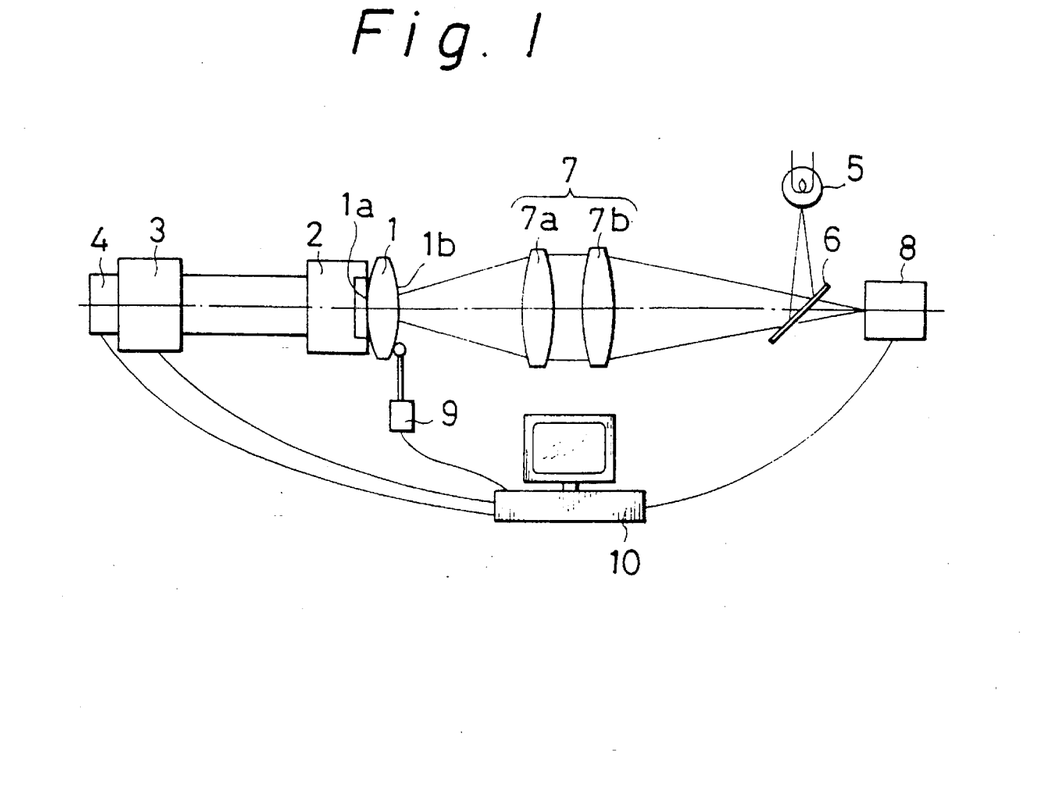
FIG. 1 is a view showing the construction of an apparatus for measuring eccentricity of an aspherical lens as a detected lens in accordance with one embodiment of the present invention.

FIG. 1 is a view showing the construction of an apparatus for measuring eccentricity of an aspherical lens as a detected lens in accordance with one embodiment of the present invention (proposed in Japanese Patent Application No. 5-2481 of the same applicant as this patent application). In FIG. 1, one face $1a$ of a detected lens 1 is set to a spherical surface, The other face $1b$ of the detected lens 1 is set to an aspherical surface. A holding means 2 of the detected lens 1 supports the detected lens 1 by adsorbing the spherical surface 1a by a cylindrical edge portion of this holding means 2. A driving means 3 is constructed by a stepping motor to accurately control a rotating angle of the detected lens 1. A rotating angle sensor 4 detects the position of a rotating origin and can detect a rotating amount of the detected lens 1 from this origin. Reference numerals 5, 6 and 7 respectively designate a light source, a beam splitter and an optical system. The optical system 7 is constructed by two lenses $7a$ and $7b$. The lens $7b$ on a light source side of the optical system 7 changes incident light to a parallel light beam. The lens $7a$ on a side of the detected lens 1 converges this parallel light beam onto a detected face. A spot position detecting means 8 is arranged on an image forming face of the optical system 7 and is constructed by a charge coupled device (CCD) camera. A displacement measuring means 9 is constructed by an electronic indicator. The displacement measuring means 9 comes in contact with the aspherical surface $1b$ of the detected lens 1. The displacement measuring means 9 measures a displacement of the detected lens in the direction of an optical axis caused by rotating the detected lens 1. A computer 10 constitutes an arithmetic means.

The detected lens 1 is supported and held by the holding means 2 on the spherical surface $1a$. The detected lens 1 is rotated by the driving means 5 around a rotating axis of the detected lens 1 approximately conforming to the optical axis thereof. A light beam emitted from the light source 5 is transmitted by the optical system 7 such that this light beam is converged to a paraxial curvature center of the aspherical surface $1b$. The light beam is irradiated and incident to a surface of the detected lens 1 in a direction perpendicular to this lens surface. This light beam is then reflected on this lens surface and reversely passes through the optical system 7. The light beam is formed as a light spot image on the spot position detecting means 8. A position of this spot image shows the optical axis of the detected lens 1. Accordingly, when the detected lens 1 is rotated, the spot image draws a circle on an image forming face in accordance with the rotation of the detected lens 1 if the rotating and optical axes of the detected lens are not in conformity with each other. The position of the spot image formed on the spot position detecting means 8 is detected as a coordinate of a center of gravity of the spot image. The angle sensor 4 calculates an angle between the spot image and the position of a rotating origin of the detected lens 1. Further, a shifting amount of the spot image from a radius of the circle is calculated. Measured data of the displacement measuring means 9 are corrected from these data of the coordinate of the center of gravity, the above angle, the shifting amount, etc. In this case, it is not necessary to correct a setting shift of the detected lens 1 with high accuracy.

Figure 2:
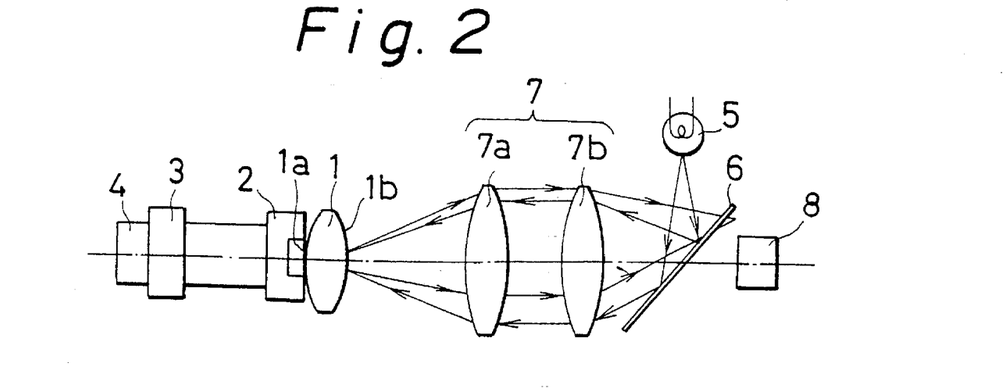
FIG. 2 is a view showing a state in which a light spot image is focused and formed outside a spot position detecting means when the detected lens is supported with great eccentricity.

However, in the above measuring method, a size of the image forming face of the spot position detecting means 8 is limited. Accordingly, as shown in FIG. 2, when the detected lens 1 is eccentrically held by the holding means 2, going and returning optical paths are different from each other as shown by arrows so that no spot image can be formed on the spot position detecting means 8. Therefore, it is necessary to focus and form the spot image on the spot position detecting means 8 by coarsely adjusting the position of the detected lens 1 in advance. However, considerable skill is required for only this coarse adjustment and it takes much time to make this coarse adjustment.

It is necessary to move the optical system 7 forward and backward in the optical axis direction and adjust and set this optical system 7 to a focusing state so as to focus and form the spot image. In accordance with this movement, it is also necessary to move the light source 5 and the spot position detecting means 8 as the image forming face on the optical axis. This focusing operation is also a very difficult work.

Further, when the rotating and optical axes of the detected lens 1 are automatically set to be in conformity with each other after the coarse adjustment, a shifting direction of the spot image and an eccentric direction of the detected lens are conformed to each other or are opposed to each other when the aspherical surface is set to a convex or concave face. Therefore, when an adjustment similar to that in the case of a convex detected face is made with respect to a concave detected face, eccentricity of the detected lens is not corrected, but is further increased.

Figure 3:
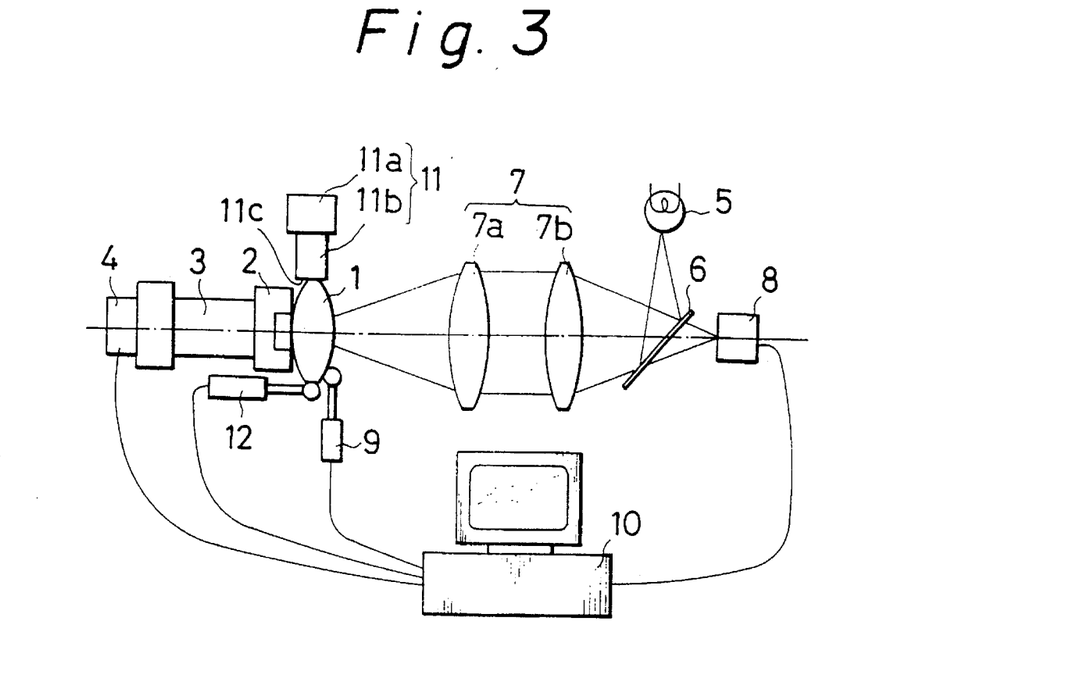
FIG. 3 is a view showing the construction of an apparatus for measuring eccentricity of an aspherical lens in accordance with another embodiment of the present invention.

FIG. 3 is a view showing the construction of an apparatus for measuring eccentricity of an aspherical lens in accordance with another embodiment of the present invention. A main construction of this measuring apparatus is similar to that explained with reference to FIG. 1. Therefore, the differences between FIGS. 1 and 3 are mainly explained in the following description. In FIG. 3, an alignment adjusting means 11 is opposed and fixed to an outer circumferential edge of a detected lens 1. The alignment adjusting means 11 is constructed by a stepping motor 11a and a cam follower 11b operated by this stepping motor 11a. A pressing face 11c of the cam follower 11b at a front end thereof comes in contact with the outer circumferential edge of the detected lens 1.

A vertical displacement measuring means 12 comes in contact with the outer circumferential edge of the detected lens 1 to measure an eccentric amount of the detected lens in a direction perpendicular to an optical axis of the detected lens 1. Namely, the vertical displacement measuring means 12 measures a displacement of the detected lens 1 in this direction. Similar to a displacement measuring means 9, this vertical displacement measuring means 12 is constructed by an electronic indicator.

A coarse adjustment of eccentricity of the detected lens 1 will next be explained. In FIG.

the pressing face 11c is set such that a distance between the pressing face 11c and the optical axis is equal to a radius of the detected lens 1. In this state, the detected lens 1 is held by the holding means 2. Similar to the explanation using FIG. 1, the detected lens 1 is rotated in this state. When a rotating axis of the detected lens 1 is shifted from the optical axis thereof, an eccentric portion of the detected lens at its outer circumferential edge is pressed by the pressing face 11c. The detected lens 1 is adsorbed by the holding means 2 on a spherical surface side thereof. When the eccentric portion is pressed by the pressing face 11c, the detected lens 1 is slid and moved on the holding means 2. Thus, when the detected lens 1 is rotated one time, a coarse adjustment of eccentricity of the detected lens 1 can be made and a light spot image can be focused and formed on the spot position detecting means 8. Normally, no optical axis of the detected lens 1 is accurately in conformity with a center of the detected lens 1. Therefore, possibility of complete conformity between the rotating axis and the optical axis of a detected face is small. However, it is possible to make a coarse adjustment in which the spot image is focused and formed on the spot position detecting means 8.

The holding means 2 adsorbs and supports the detected lens 1 on its spherical surface 1a at a cylindrical end edge of this holding means. Accordingly, a center of curvature of the spherical surface 1a is located in a constant position at any time even when the detected lens 1 is slid and moved on the holding means 2 as mentioned above.

Figure 4:
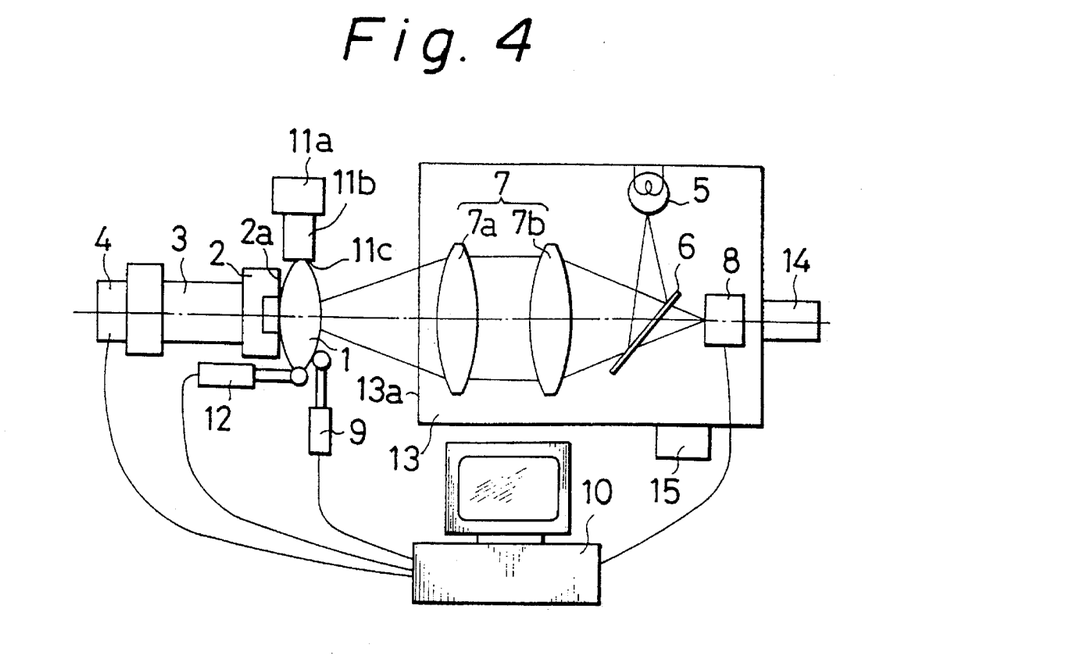
FIG. 4 is a view showing the construction of an apparatus for measuring eccentricity of an aspherical lens in accordance with another embodiment of the present invention.

FIG. 4 is a view showing the construction of an apparatus for measuring eccentricity of an aspherical lens in accordance with another embodiment of the present invention. In this embodiment, a light source 5, a beam splitter 6, an optical system 7 and a spot position detecting means 8 as shown in FIG. 3 are collected and fixedly arranged on one stage 13. The stage 13 can be moved forward and backward in the direction of an optical axis by a stage driving means 14 constructed by a stepping motor, a ball screw, a nut, etc.

A position of the stage 13 is detected by a stage position detecting means 15 constructed by a linear scale, etc. The stage position detecting means 15 detects the position of the stage 13 as a position of a stage face 13a on a side of the holding means 2. In this case, the position of the stage 15 is set to zero when the stage face 13a is in conformity with a receiving face 2a of the holding means 2.

Figure 5:
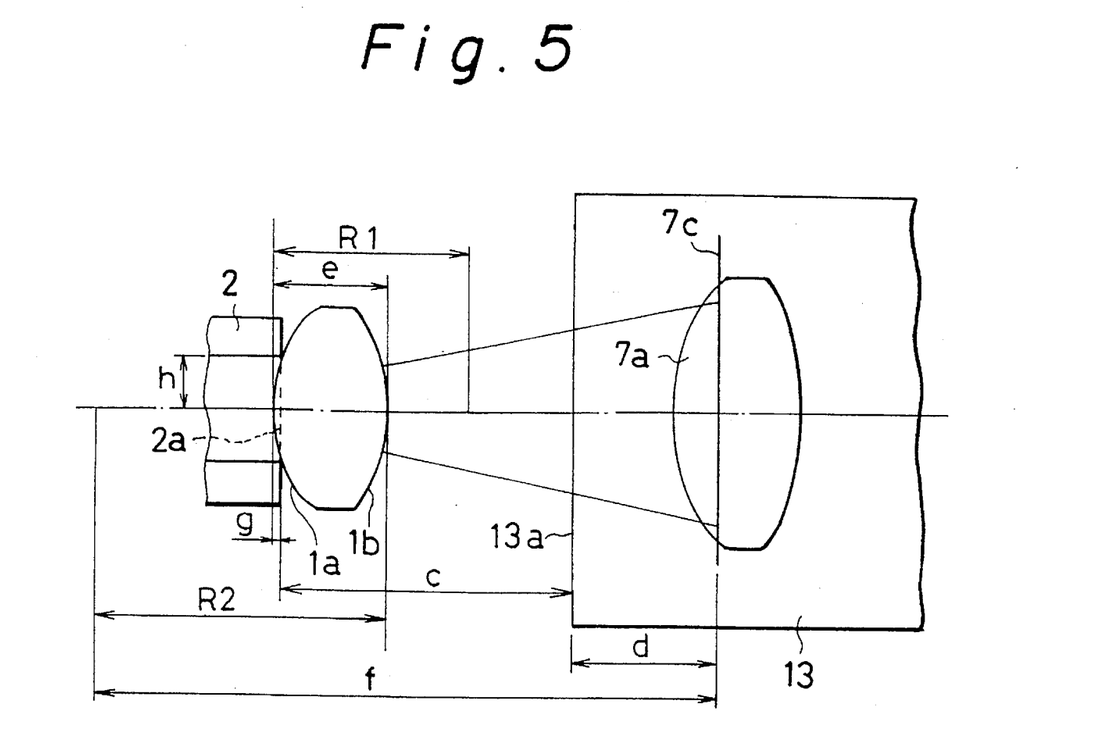
FIG. 5 is a view for enlarging a portion of the measuring apparatus shown in FIG. 4 and showing the relation between a detected lens, an optical system and a stage.

FIG. 5 is a partially enlarged view of the detected lens 1 and a converging lens 7a. Parameters c, d, R1, R2, h, e, f and g are set as follows when each of a spherical surface 1a and an aspherical surface 1b of the detected lens 1 is set to a convex face. The parameter c is set to a distance from the receiving face 2a to the stage face 13a. The parameter d is set to a distance from the stage face 13a to a principal plane 7c of the converging lens 7a on a side opposed to the detected lens 1. The parameter R1 is set to a radius of curvature of the spherical surface 1a of the detected lens 1 on a holding side thereof. The parameter R2 is set to a paraxial curvature radius of the aspherical surface 1b. The parameter h is set to a radius of the receiving face 2a. The parameter e is set to a thickness of the detected lens 1. The parameter f is set to a focal length of the converging lens 7a. The parameter g is set to a distance from the receiving face 2a to a vertex of the spherical surface 1a. In this case, the distance g is provided by the following formula (1).

$$g = 1 - R1 \cos\{\sin^{-1}(h/R1)\} \quad (1)$$

The distance c is provided by the following formula (2).

$$c = f - d - \{R2 - (e-g)\} \quad (2)$$

Light reflected on the aspherical surface 1b as a detected face is focused and formed as an image in a position of the stage 13 providing this distance c.

Similarly, when the spherical surface 1a of the detected lens 1 as a holding face is a concave face and the detected face 1b is a convex face, light reflected on the detected face 1b is focused and formed as an image in a position of the stage 13 providing the following distance c.

$$c = f - d - \{R2 - (e+g)\} \quad (3)$$

When the holding face 1a of the detected lens 1 is a concave face and the detected face 1b is a convex face, light reflected on the detected face 1b is focused and formed as an image in a position of the stage 13 providing the following distance c.

When both the surfaces of the detected lens 1 are concave faces, light reflected on the detected face 1b is focused and formed as an image in a position of the stage 13 providing the following distance c.

$$c = f - d + \{R2 + (e+g)\} \quad (5)$$

In the above formulas (1) to (5), the values f, d, R2 and e are known and it is also known that both the surfaces of the detected lens are convex or concave faces. Further, the value g can be calculated. Accordingly, an arithmetic means can select any one of the formulas (2) to (5) by inputting the respective values and conditions to the arithmetic means before measurement. Otherwise, each of the surfaces of the detected lens 1 may be judged as a concave or convex face by a radius of curvature of the detected lens or a sign of the paraxial curvature radius as known shape data.

When the present position of the stage 13 is set to x and a moving amount of the stage 13 from the present position is set to Δx, the following formula (6) is formed.

$$\Delta x = c - x \qquad (6)$$

The stage 13 is moved by providing this moving amount Δx to the stage driving means 14. At this time, the stage 13 can be automatically positioned by detecting the position of the stage 13 by the stage position detecting means 15 and performing a feedback operation of this stage position. The light source 5, the beam splitter 6 and the spot position detecting means 8 are fixed together to the stage 13. The light source 5, the beam splitter 6 and the spot position detecting means 8 can be simultaneously positioned by positioning the optical system 7 so that the positioning operation can be easily performed.

The next explanation relates to an automatic adjustment of a setting shift of the detected lens using a stepping motor 11a and a vertical displacement measuring means 12.

A light spot image is focused and formed on the spot position detecting means 8 by the above-mentioned coarse adjustment. When the detected lens 1 is rotated, the spot image draws a circle as mentioned above if the optical axis and the rotating axis of the detected lens 1 are not in conformity with each other. The vertical displacement measuring means 12 also measures a displacement (deflection) of an outer circumferential edge of the detected lens 1 in a direction perpendicular to the optical axis. A size of the circle drawn by a center of gravity of the spot image detected by the spot position detecting means 8 is inputted to an arithmetic unit 10. Data of an angle between a rotating origin detected by the angle sensor 4 and the center of gravity of the spot image are also inputted to the arithmetic unit 10. Further, the displacement of the detected lens 1 measured by the vertical displacement measuring means 12 is inputted to the arithmetic unit 10.

Figure 6A:
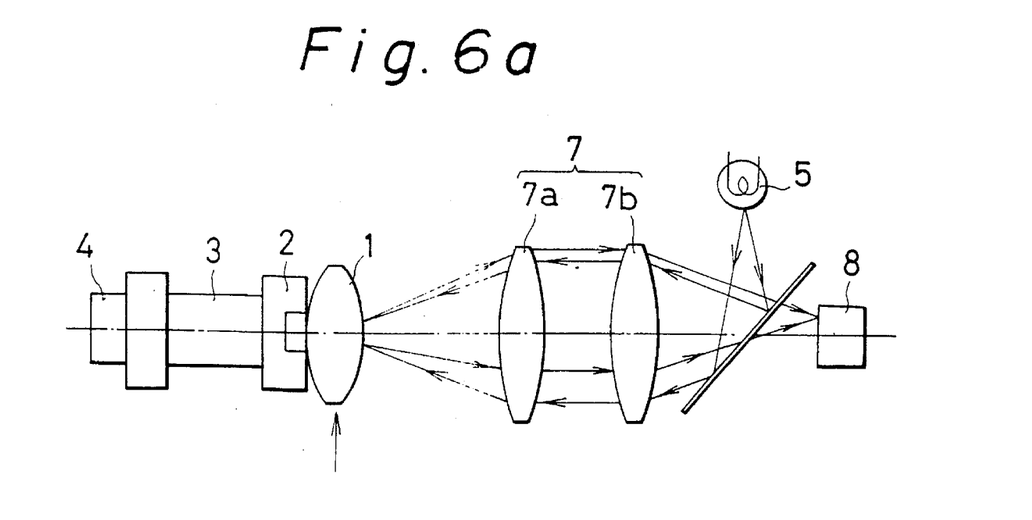
FIG. 6a is a view showing a state in which eccentric directions of the detected lens and a light spot image are different from each other in accordance with a shape of the detected lens when the detected lens is constructed by a biconvex lens.
Figure 6B:
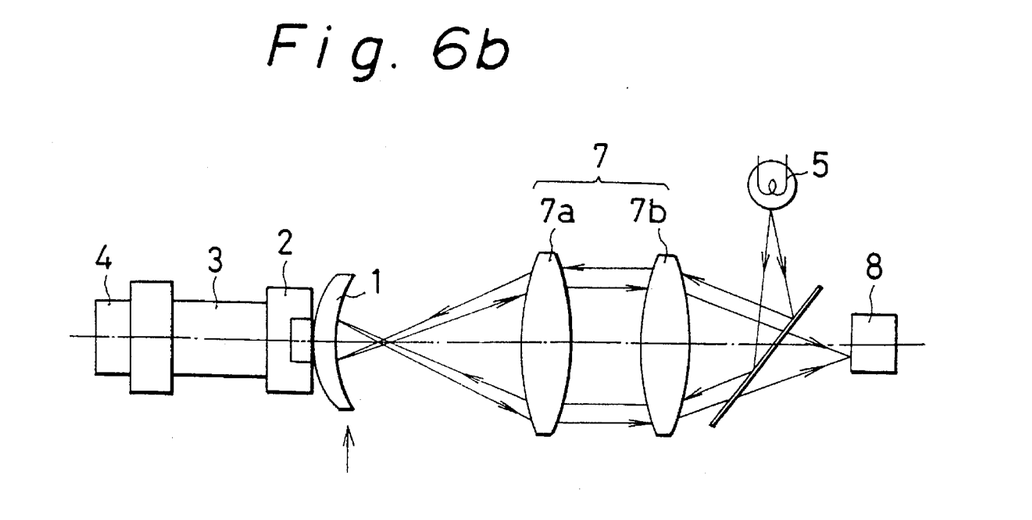
FIG. 6b is a view showing a state in which eccentric directions of the detected lens and a light spot image are different from each other in accordance with a shape of the detected lens when the detected lens is convex on one side and is concave on the other side.

Each of FIGS. 6a and 6b is a view for explaining a state in which an eccentric direction of the detected lens and a shifting direction of the spot image are changed in accordance with a shape of the detected lens. FIG. 6a shows a case in which the detected lens 1 is constructed by a biconvex lens and is eccentrically supported by the holding means 2 below the optical axis. A light beam from the light source 5 is transmitted as shown by an arrow and is reflected on a detected face. Since the detected lens is eccentric, a spot image is focused and formed above an optical axis of the spot position detecting means 8. In this case, eccentricity of the detected lens 1 is corrected by pushing the detected lens 1 from below to above as shown by an arrow in FIG. 6a.

FIG. 6b shows a case in which the detected lens is constructed by a lens having a concave face on one side and having a convex face on the other side. Similar to the case of FIG. 6a, the detected lens 1 is eccentrically supported below the optical axis. In this case, since a detected face is set to a concave face, a spot image is focused and formed below the optical axis. A focusing position of the spot image is opposite to that shown in FIG. 6a.

As mentioned above, the arithmetic unit 10 can calculate an eccentric amount of a certain constructional portion of the detected lens 1 on an outer or inner circumferential side thereof in consideration of a shape of the detected lens 1 to be measured if this shape of the detected lens is inputted to the arithmetic unit 10 in advance. Therefore, an outermost eccentric portion of the detected lens 1 is moved to the position of a pressing face 11c of the alignment adjusting means 11 by giving commands to the driving means 3. Next, the detected lens 1 is pushed by the pressing face 11c by giving commands to the stepping motor 11a so as to correct a displacing amount of the detected lens 1. At this time, the vertical displacement measuring means 12 measures a moving distance of the detected lens 1 and this measured moving distance is fed back to the stepping motor 11a. When the displacing amount of the detected lens 1 is minus or negative, the detected lens 1 is rotated 180° and is pressed from an opposite side.

When the detected lens 1 is rotated one time, the rotating and optical axes of the detected lens 1 should be in conformity with each other. However, it is confirmed by further rotating the detected lens 1 whether the spot image draws a circle or not. If the circle is still drawn, the above procedures are continuously repeated until no spot image is moved.

When the rotating and optical axes of the detected lens are completely in conformity with each other, the displacement (deflection) of a detected face in the optical axis direction is measured by the displacement measuring means 9 by again rotating the detected lens 1. A total deflection width is divided by a displacement-angle conversion coefficient calculated in advance so that an eccentric amount of an aspherical surface of the detected lens 1 with respect to the optical axis can be calculated. A detailed method for calculating this eccentric amount is described in the above-mentioned Japanese patent application relative to FIG. 1.

As mentioned above, the measuring apparatus in the present invention has a pressing face coming in contact with an outer circumferential edge of the detected lens and pushing and moving the detected lens in a direction approximately perpendicular to an optical axis of the detected lens. The pressing face is arranged in a position separated from the optical axis by a radius of the detected lens. Accordingly, it is possible to very simply make a coarse adjustment of the detected lens in which a spot image is focused and formed on a limited image forming face.

A light source, an optical system and the image forming face are fixed onto the same stage. The spot image is focused and formed on the image forming face by moving the stage forward and backward in an optical axis direction. Accordingly, the spot image can be easily formed and no skill for such an adjustment is required.

Shape data of the detected lens are inputted to an arithmetic unit in advance. The arithmetic unit gives commands to an alignment adjusting means in accordance with a shape of the detected lens. Accordingly, the detected lens can be positioned irrespective of concaveness and convexness of a detected face.

In this case, the optical system can be automatically positioned by inputting face shape data, etc. to the arithmetic unit.

An apparatus for measuring eccentricity of an aspherical lens in accordance with another embodiment of the present invention will next be described with reference to FIG. 1 explained above.

In FIG. 1, one face 1a of a detected lens 1 is set to a spherical surface. The other face 1b of the detected lens 1 is set to an aspherical surface. A holding means 2 holds the detected lens 1 on a side of the spherical surface 1a and is constructed by a spindle. A driving means 3 for rotating the spindle is constructed by a stepping motor to accurately control a rotating angle of the spindle. An angle sensor 4 detects a rotating angle of the stepping motor 5. Reference numerals 5, 6 and 7 respectively designate a light source, a beam splitter and an optical system. The optical system 7 is constructed by two lenses 7a and 7b. A spot position detecting means 8 is arranged on an image forming face of the optical system 7 and is constructed by a charge coupled device (CCD) camera. A displacement measuring means 9 is constructed by an electronic indicator. The displacement measuring means 9 comes in contact with the aspherical surface 1b of the detected lens 1. The displacement measuring means 9 measures a displacement of the detected lens in the direction of an optical axis caused by rotating the detected lens 1. A computer 10 constitutes an arithmetic means.

Light emitted from the light source 5 is reflected on the beam splitter 6 and is converged onto the aspherical surface 1b by the optical system 7. Light reflected on the detected lens 1 is transmitted in a direction reverse to the above optical path. This light is then transmitted through the beam splitter 6 and is converged to the spot position detecting means 8 located on an image forming face of the optical system 7. Thus, a spot image is focused and formed on the spot position detecting means 8.

The detected lens 1 is held by the spindle 2. A shaft of the spindle 2 is rotated as a rotating axis by the driving means 3 to which the angle sensor 4 for detecting the above rotating angle is attached. The displacement measuring means 9 measures a deflection or displacement of the aspherical surface 1b caused by rotating the detected lens 1 in the optical axis direction. A measured value of this displacement is inputted to the arithmetic means 10. The angle sensor 4 sequentially measures a rotating angle of the detected lens 1 rotated by the driving means The measured rotating angle is inputted to the arithmetic means 10. Accordingly, the arithmetic means 10 provides the deflection of the aspherical surface 1b in the optical axis direction at an arbitrary rotating angle.

Figure 7A:
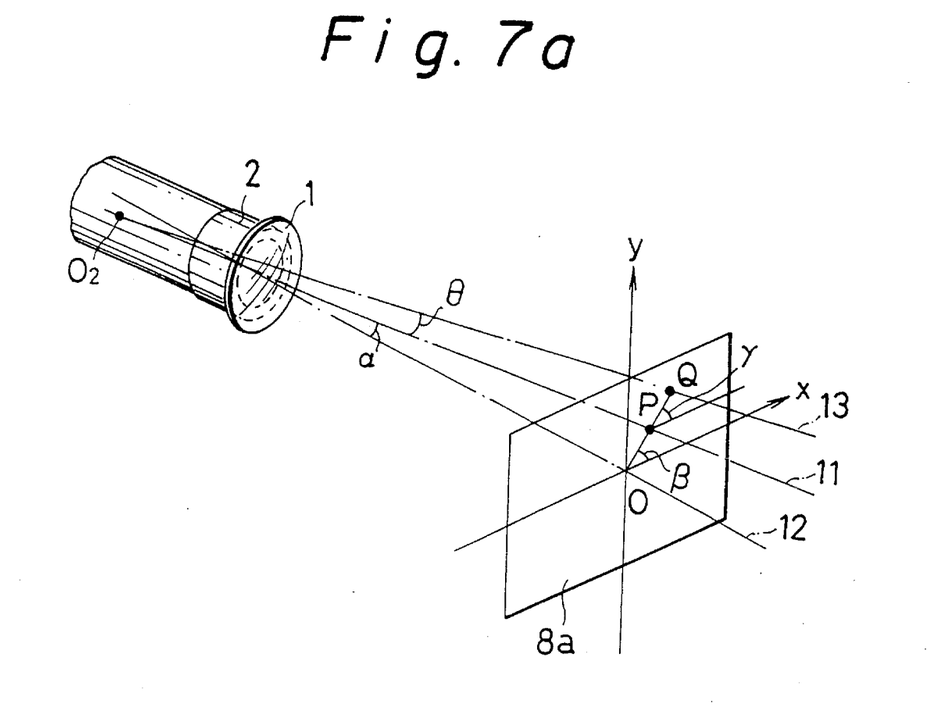
FIG. 7a is a view showing a setting shift of the detected lens and a detecting principle of eccentricity of the detected lens.

FIG. 7a is a conceptional view showing the relation between the detected lens 1, an image forming face 8a of the spot position detecting means 8, an optical axis 11 of the detected lens, a rotating axis 12 of the spindle and an aspherical surface axis 13 when no lenses 7a and 7b are considered.

In FIG. 7a, reference numeral 0 is set to an intersecting point between the rotating axis 12 and the image forming face 8a. Reference numeral P is set to an intersecting point between the optical axis 11 and the image forming face 8a. Reference numeral Q is set to an intersecting point between the aspherical surface axis 13 and the image forming face 8a. Further, x and y axes perpendicular to each other are set on the image forming face 8a as shown in FIG. 7a.

An angle α between the optical axis 11 and the rotating axis 12 of the spindle shows an error amount caused by a setting shift. An angle β between a line segment OP and the x-axis shows a direction of this error. When the optical axis 11 is rotated in conformity with the rotating axis 12, an angle θ between the optical axis 11 and the aspherical surface axis 13 shows a net eccentric amount. An angle γ between a line segment PQ and the x-axis shows an eccentric direction.

Figure 7B:
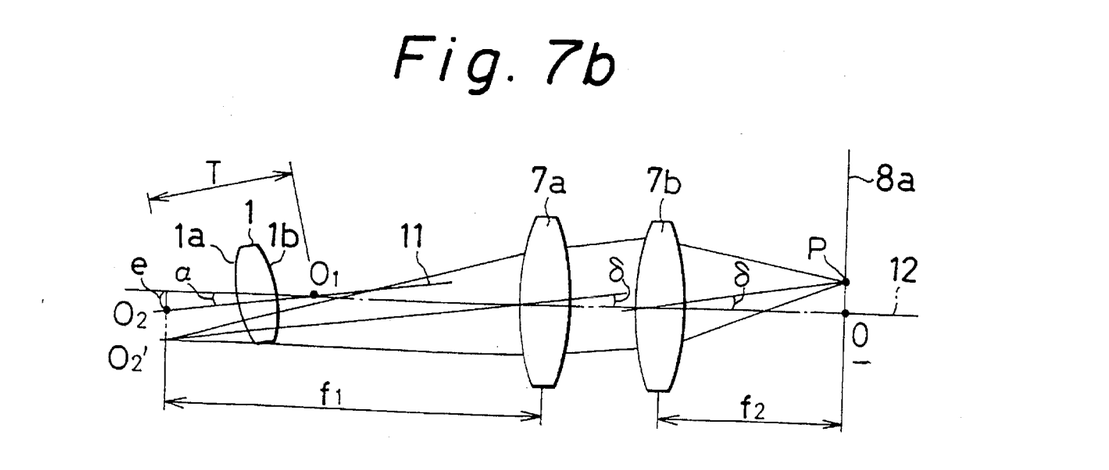
FIG. 7b is a view showing a setting shift of the detected lens and a detecting principle of eccentricity of the detected lens when lenses are considered.

FIG. 7b is a view showing the relation between the detected lens 1 and the image forming face 8a when two lenses 7a and 7b are considered. A point $O_1$ shows a center of curvature of a curved surface 1a of the detected lens 1. A point $O_2$ shows a center of curvature of the aspherical surface 1b near the optical axis. Accordingly, a line connecting the points $O_1$ and $O_2$ to each other is set to the optical axis 11 of the detected lens. The holding means 2 holds a spherical surface side of the detected lens 1. The curvature center $O_1$ on the side of the spherical surface 1a is located on the rotating axis 12 at any time irrespective of a value of the setting shift α. The other point $O_2$ is shifted from the rotating axis 12 as shown in FIG. 7b since the setting shift α is caused with respect to the detected lens 1.

Light is emitted from the light source 5 such that this light is converged to the point $O_2$ by the lens 7a. However, since the setting shift α is caused, the light is transmitted such that this light is converged to a point $O_2'$ near the point $O_2$. Light reflected on a detected face 1b is approximately returned to an original optical path so that this light is transmitted through the lenses 7a and 7b and is focused and formed as a spot image at a point P on the image forming face 8a.

When the spindle 2 is rotated, the spot image at the point P is rotated on the image forming face 8a around the point O as a center. The optical axis 11 and the above light reflected on the detected lens 1 formed as an image by the spot position detecting means 8 has a relation shown in FIG. 7b and represented by the following formulas.

$R = f_2 \tan \delta$ $(f_1 \tan \delta)/2 = T \sin \alpha = e$

Here, $f_1$ is set to a focal length of the lens 7a.

$f_2$ is set to a focal length of the lens 7b.

δ is set to an angle between the reflected light and the rotating axis.

α is set to an angle between the optical axis 11 of the detected lens and the rotating axis 12.

Value e is set to a distance between the point $O_2$ and the rotating axis 12.

A coordinate of the spot image at an arbitrary rotating angle can be read with respect to a circle drawn by rotating the spot image.

Therefore, for example, the coordinate of a center of gravity of this spot image can be taken out as an electric signal by using a charge coupled device (CCD) camera as the spot position detecting means 8. This electric signal is inputted to the arithmetic means 10. Thus, a radius R of the circle drawn by the spot image can be calculated and the angle α between the optical axis 11 and the rotating axis 12 can be calculated. The reflected spot image and the optical axis 11 as shown in FIGS. 7a and 7b pass through the same point $O_1$ and the same rotating axis 12. Therefore, the reflected spot image and the optical axis 11 are considered to be located on the same plane. Accordingly, the angle β can be calculated if the detected lens 1 is rotated and a rotating angle of the detected lens is read from the angle sensor 4 when the reflected spot image passes through the position of a rotating origin.

In accordance with rotation of the spindle 2, the displacement measuring means 9 constructed by an electronic indicator measures a displacement Do(i) of the aspherical surface in the optical axis direction in each of positions in which circumference 2π is equally divided into i-parts. Data of the measured displacement are inputted to the arithmetic means 10. This detected displacement Do(i) includes an error caused by the setting shift α.

The real deflection D(i) as a corrected displacement can be calculated from the obtained measured value Do(i) by the following formula.

$D(i) = Do(i) - A \alpha \cos[\{2\pi(i-1)/n\} + \beta]$ (μm)

In this formula, values i, n and A are respectively set to a counting number, a sampling number and a conversion coefficient (μm/min). Values α and β are respectively set to a setting shift and a setting shift direction.

Figure 8:
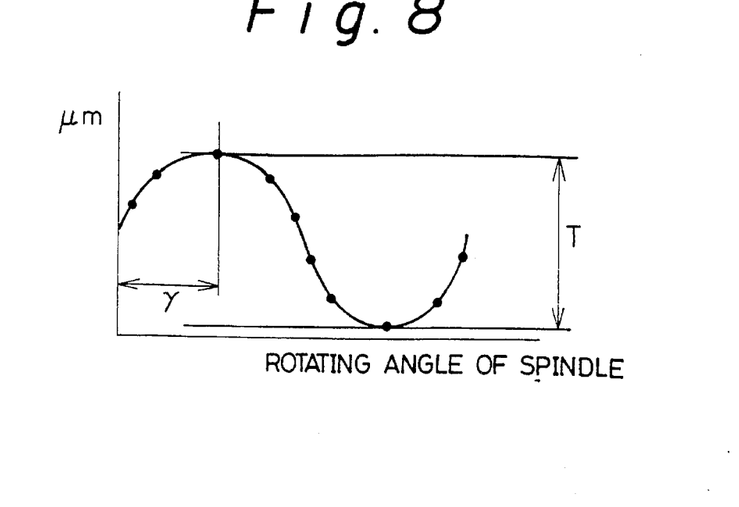
FIG. 8 is a view of a corrected deflection or displacement plotted in each of divisional positions provided by equally dividing one rotation of the detected lens into i-rotating parts.

FIG. 8 shows one example of a sine wave curve drawn by i-corrected displacements calculated from the above formula. A net eccentric amount can be calculated from a total width T shown in FIG. 8 by a method described in Japanese patent application No. 4-29995, etc. An initial phase shows an eccentric direction γ.

Figure 9A:
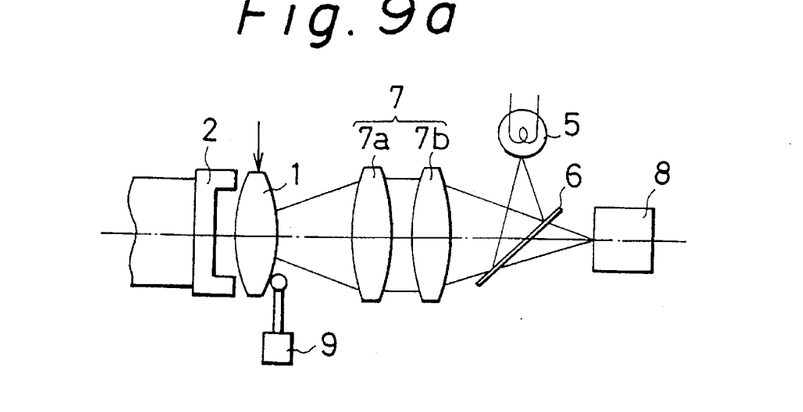
FIG. 9a is a view for explaining a method for obtaining a conversion coefficient in which a setting shift of the detected lens is caused by applying force to the detected lens in a direction perpendicular to an optical axis of the detected lens before the setting shift is caused.
Figure 10:
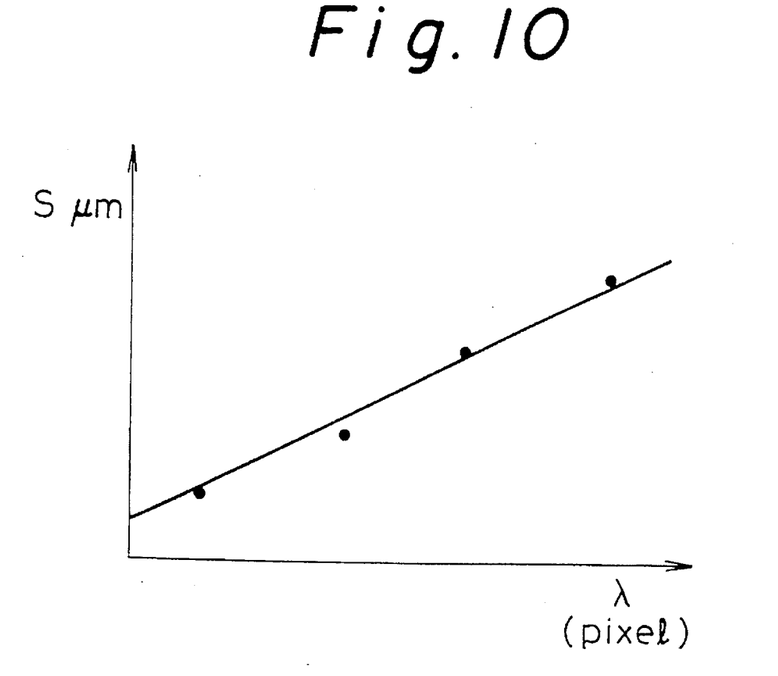
FIG. 10 is a plotted view in which the setting shift is caused as shown in FIGS. 9a and 9b and an axis of ordinate shows a displacement of the detected lens detected by a displacement measuring means and an axis of abscissa shows the movement of a spot image caused by this displacement.

Each of FIGS. 9 and 10 is a view for explaining one calculating example of the conversion coefficient A in the above formula. FIG. 9a shows a state in which optical and rotating axes of the detected lens 1 are in conformity with each other. Reflected light from the detected lens 1 is focused and formed as an image at a center of the spot position detecting means 8.

Figure 9B:
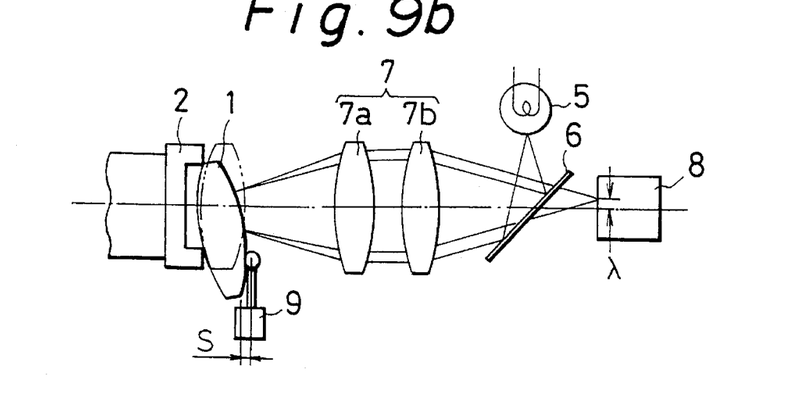
FIG. 9b is a view for explaining a method for obtaining a conversion coefficient in which a setting shift of the detected lens is caused by applying force to the detected lens in a direction perpendicular to an optical axis of the detected lens after the setting shift is caused.

As shown in FIG. 9b, the detected lens 1 located in this position is slightly shifted by applying an external force to this detected lens in an arrow direction. In this case, a spot image is focused and formed in a position shifted from the center of the spot position detecting means 8. A displacement measuring means 9 detects a deflecting amount S (μm) of a detected face of the detected lens in an optical axis direction. The spot position detecting means 8 detects a shifting amount λ (pixel) from a point $O_2$. The conversion coefficient can be calculated as A=(SB)/λ(μm/pixel). In this case, B is set to a moving amount of a reflected light spot moved on the position detecting means when the reflected light spot is inclined one minute. This value B is simply provided by an experiment.

In FIG. 9a, the optical axis and the rotating axis are first set to be in conformity with each other. However, the conversion coefficient can be calculated by the same calculating method since the shifting amount is normally small even when the optical axis and the rotating axis are not in conformity with each other.

In FIG. 10, an axis of abscissa shows the moving amount λ (pixel) of the light spot and an axis of ordinate shows the deflecting amount S (μm) of the detected face in the optical axis direction. The detected lens 1 is slightly moved arbitrary times in a direction perpendicular to the optical axis as shown in FIGS. 9a and 9b. Measured results of each of these movements are plotted in FIG. 10. The conversion coefficient A can be calculated when a regression straight line is drawn along these plotted points and an inclination of this regression straight line is calculated. The conversion coefficient A can be more accurately calculated if a range of the displacement S of the detected lens is set to be wide and the measuring operation is performed many times.

Figure 11:
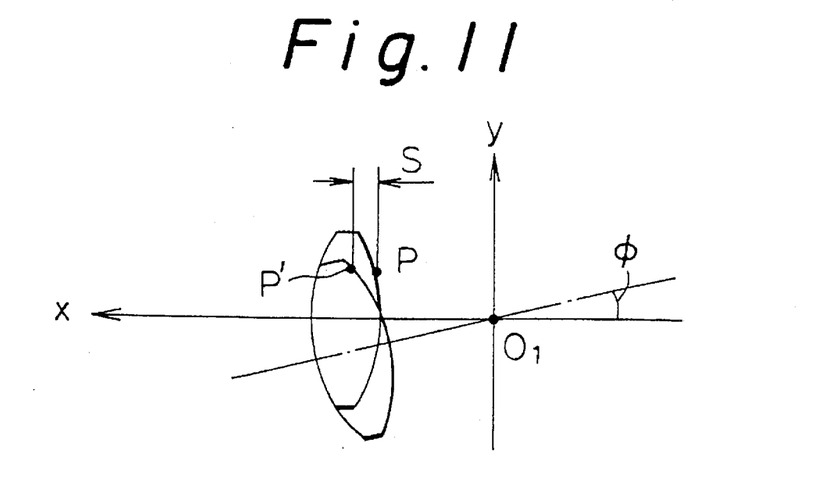
FIG. 11 is a view for explaining a generating state of a deflection or displacement S when the detected lens is rotated by a rotating angle $\phi$ around a center $O_1$ of curvature of a spherical surface of the detected lens as a center.

FIG. 11 is a view for explaining another method for calculating the conversion coefficient. A center $O_1$ of curvature of a spherical surface of the detected lens 1 is set to an origin. A rotating axis 12 of the spindle is set to an x-axis. A line segment perpendicular to the x-axis at the origin $O_1$ is set to a y-axis. When the detected lens 1 is pushed in a direction perpendicular to the optical axis, the detected lens 1 is rotated around the origin $O_1$ as a center. A rotating angle of the detected lens is set to φ (minute). At this time, the displacement measuring means 9 measures a deflecting amount S of a detected face in an x-axis direction.

A value of this deflecting amount S can be calculated from a shape parameter of the detected lens 1. Accordingly, the deflection of the detected face in the optical axis direction can be calculated by S/φ when a reflected light spot is inclined a unit angle (one minute).

Figure 12:
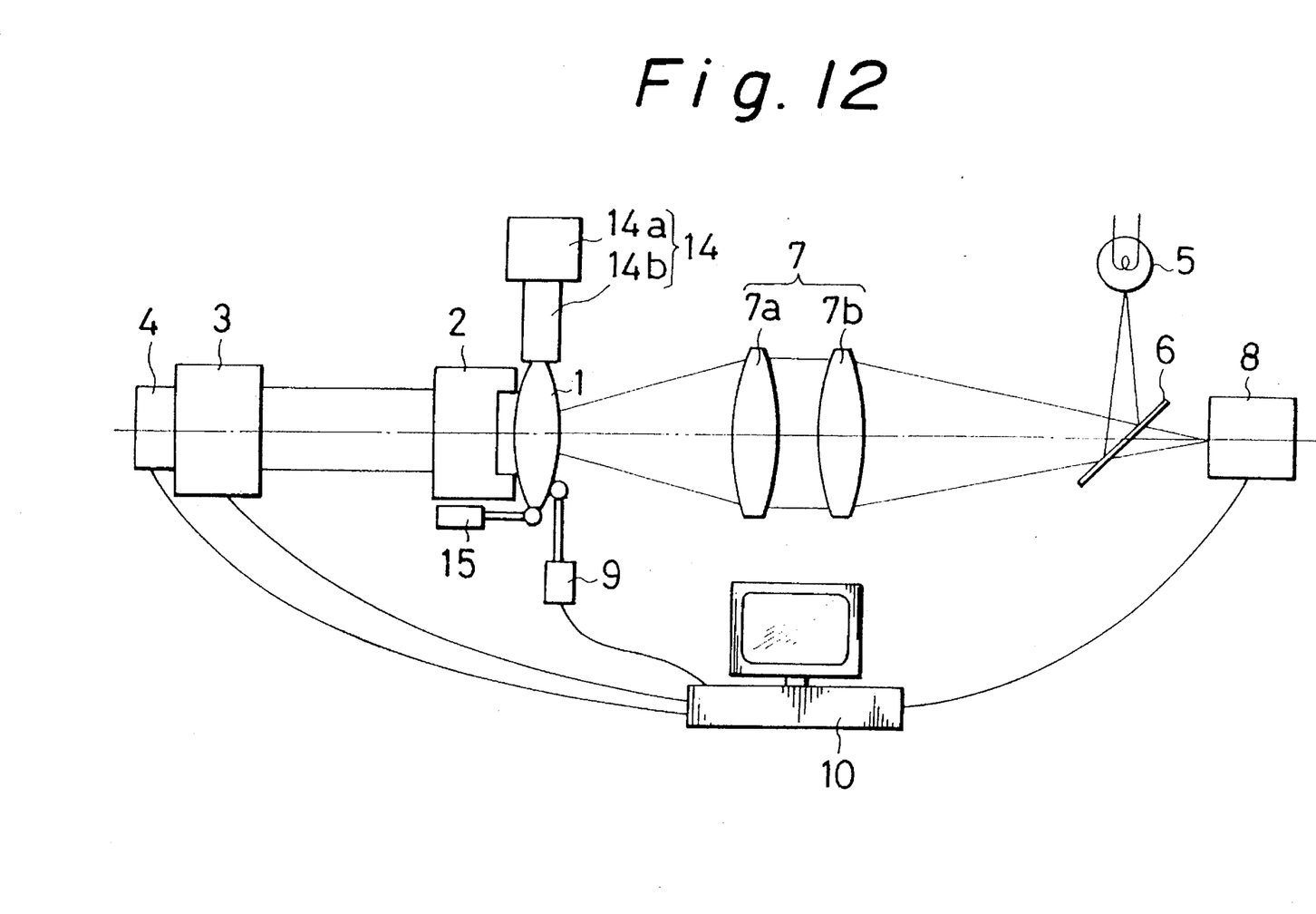
FIG. 12 is a view showing the construction of an apparatus for measuring eccentricity of an aspherical lens in accordance with another embodiment of the present invention.

FIG. 12 shows the construction of an apparatus for measuring eccentricity of an aspherical lens in accordance with another embodiment of the present invention. In this embodiment, in addition to the measuring apparatus shown in FIG. 1, the eccentricity measuring apparatus has an actuator 14 for applying an external force to a detected lens 1 held by a holding means in a direction approximately perpendicular to an optical axis of the detected lens. The actuator 14 is constructed by a stepping motor 14a and a cam follower 14b operated by this stepping motor. A vertical displacement measuring means 15 is arranged on a side of the detected lens 1 opposed to the actuator 14. The vertical displacement measuring means 15 measures a displacing amount of the detected lens 1 displaced in a direction perpendicular to the optical axis. The vertical displacement measuring means 15 is constructed by an electronic indicator similar to that of the displacement measuring means 9.

As explained with reference to FIG. 1, a setting shift α (minute) and a setting direction β (degree) of the detected lens 1 can be calculated by an angle sensor 4 and a spot position detecting means 8. Accordingly, an arithmetic means 10 calculates a setting shift in a direction perpendicular to the optical axis from a value of the setting shift α. The arithmetic means 10 gives commands to a driving means S in accordance with such calculated values so as to rotate the detected lens 1 until a rotating angle of the detected lens is set to be equal to β by the angle sensor 4. Next, the detected lens 1 is moved by a designated amount from a position indicative of this rotating angle in a direction perpendicular to the optical axis by a feedback system constructed by the actuator 14 and the vertical displacement measuring means 15.

When a moving amount of the detected lens is negative, the detected lens 1 is rotated 180° and is pushed by the actuator 14 from an opposite side to correct the position of the detected lens.

As mentioned above, in accordance with the present invention, true eccentricity of an aspherical lens as the detected lens can be calculated by correction in an eccentric measurement thereof without correcting a setting shift of the detected lens. Accordingly, a setting operation of the detected lens requiring skill can be omitted and eccentricity of the detected lens can be precisely measured for a short time.

Further, a setting shift of the detected lens can be automatically corrected if the detected lens is displaced by a correction value calculated by the arithmetic means in a direction approximately perpendicular to the optical axis in cooperation with the arithmetic means, the displacement measuring means and the actuator.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for measuring eccentricity of an aspherical lens and having a process in which a detected lens having an aspherical surface on only one lens face is rotated around a rotating axis approximately conforming to an optical axis of the detected lens;

light is irradiated onto the detected lens in a direction of the rotating axis and reflected light from the detected lens is focused and formed as a spot image on an image forming face of an optical system; and a shift between the optical axis and the rotating axis of the detected lens and a direction of this shift are detected by a size of a circle drawn by the spot image when the detected lens is rotated;

the eccentricity measuring method measuring eccentricity between an axis of the aspherical surface and the optical axis and comprising the steps of:

forming a pressing face for pushing and moving the detected lens in a direction approximately perpendicular to the optical axis in a state in which the pressing face comes in contact with an outer circumferential edge of the detected lens;

arranging the pressing face in a position separated from the optical axis by a radius of the detected lens before the spot image is focused and formed on said image forming face; and coarsely adjusting a position of the detected lens while said lens is rotated.

2. A method for measuring eccentricity of an aspherical lens and having a process in which a detected lens having an aspherical surface on only one lens face is rotated around a rotating axis approximately conforming to an optical axis of the detected lens;

light is irradiated from a light source onto the detected lens in a direction of the rotating axis and reflected light from the detected lens is focused and formed as a spot image on an image forming face of an optical system; and a shift between the optical axis and the rotating axis of the detected lens and a direction of this shift are detected by the size of a circle drawn by the spot image when the detected lens is rotated;

the eccentricity measuring method measuring eccentricity between an axis of the aspherical surface and the optical axis and comprising the steps of:

fixing the light source, the optical system and the image forming face onto the same stage; and forming the spot image on the image forming face by moving the stage forward and backward in a direction of the optical axis.

3. A method for measuring eccentricity of an aspherical lens and having a process in which a detected lens having an aspherical surface on only one lens face is rotated around a rotating axis approximately conforming to an optical axis of the detected lens;

light is irradiated from a light source onto the detected lens in a direction of the rotating axis and reflected light from the detected lens is focused and formed as a spot image on an image forming face of an optical system; and a shift between the optical axis and the rotating axis of the detected lens and a direction of said shift are detected by a size of a circle drawn by the spot image when the detected lens is rotated;

the eccentricity measuring method measuring eccentricity between an axis of the aspherical surface and the optical axis and comprising the steps of:

detecting the shift between the optical axis and the rotating axis and the direction of the shift by arithmetic means; and correcting said shift by the arithmetic means by moving the detected lens in a direction perpendicular to the optical axis in accordance with shape data of the detected lens inputted to the arithmetic means in advance.

4. An apparatus for measuring eccentricity of an aspherical lens, comprising:

means for holding a detected lens having an aspherical surface on only one lens face;

driving means for rotating the holding means around a rotating axis approximately overlapping an optical axis of the detected lens;

an angle sensor for detecting a rotating angle of the detected lens;

a light source for irradiating light onto the detected lens in a direction of the rotating axis;

an optical system for focusing and forming a spot image of reflected light from the detected lens;

means for detecting a position of the spot image and arranged on an image forming face of the optical system;

displacement measuring means for measuring a deflection of a detected face of the detected lens in a direction of the optical axis; and a pressing face for moving the detected lens in a direction perpendicular to the optical axis in a state in which the pressing face comes in contact with an outer circumferential edge of the detected lens during rotation;

the pressing face being disposed in a position separated from the optical axis by a radius of the detected lens.

5. An apparatus for measuring eccentricity of an aspherical lens, comprising:

means for holding a detected lens having an aspherical surface on only one lens face;

first driving means for rotating the holding means around a rotating axis approximately overlapping an optical axis of the detected lens;

an angle sensor for detecting a rotating angle of the detected lens;

a light source for irradiating light onto the detected lens in a direction of the rotating axis;

an optical system for focusing and forming a spot image of reflected light from the detected lens;

means for detecting a position of the spot image and arranged on an image forming face of the optical system;

displacement measuring means for measuring a deflection of a detected face of the detected lens in a direction of the optical axis; and second driving means for fixing the light source, the optical system and the spot position detecting means onto a single stage and moving the single stage forward and backward along the optical axis of the detected lens.

6. An apparatus for measuring eccentricity of an aspherical lens, comprising:

means for holding a detected lens having an aspherical surface on only one lens face;

first driving means for rotating the holding means around a rotating axis approximately overlapping an optical axis of the detected lens;

angle sensor for detecting a rotating angle of the detected lens;

a light source for irradiating light onto the detected lens in a direction of the rotating lens;

an optical system for focusing and forming a spot image of reflected light from the detected lens;

means for detecting a position of the spot image and arranged on an image forming face of the optical system;

displacement measuring means for measuring a deflection of a detected face of the detected lens in a direction of the optical axis;

second driving means for fixing the light source, the optical system and the spot position detecting means onto a single stage and moving the single stage forward and backward along the optical axis of the detected lens;

stage position detecting means for detecting a position of the single stage on the optical axis; and arithmetic means for controlling an operation of said second driving means, wherein the arithmetic means performs feedback control of said second driving means based on shape data of the detected lens, data of the optical system and stage position data from the stage position detecting means.

7. An apparatus for measuring eccentricity of an aspherical lens, comprising means for holding a detected lens having an aspherical surface on only one lens face;

first driving means for rotating the holding means around a rotating axis approximately overlapping an optical of the detected lens;

an angle sensor for detecting a rotating angle of the detected lens;

a light source for irradiating light onto the detected lens in a direction of the rotating axis;

an optical system for focusing and forming a spot image of reflected light from the detected lens;

means for detecting a position of the spot image and arranged on an image forming face of the optical system;

displacement measuring means for measuring a deflection of a detected face of the detected lens in a direction of the optical axis;

second driving means for fixing the light source, the optical system and the spot position detecting means onto a single stage and moving the single stage forward and backward along the optical axis of the detected lens; and arithmetic means for detecting a shift between the optical axis and the rotating axis and a shifting direction;

wherein the arithmetic means corrects said shift by moving the detected lens in a direction perpendicular to the optical axis in accordance with shape data of the detected lens inputted to the arithmetic means in advance.

8. A method for measuring eccentricity of an aspherical lens, comprising the steps of:

rotating a detected lens having an aspherical surface on only one lens face around a rotating axis approximately conforming to an optical axis of the detected lens;

irradiating light onto the detected lens in a direction of the rotating axis;

focusing and forming reflected light from the detected lens as a spot image on an image forming face of an optical system;

detecting a shift between the optical axis and the rotating axis by a size of a circle drawn by the spot image when the detected lens is rotated;

setting a reference position in an outer circumference of the detected lens;

calculating a direction of said shift from an angle formed between a line connecting the reference position and a rotating center of the detected lens to each other and a line connecting the spot image and the rotating center of the detected lens to each other;

measuring a deflection of the aspherical surface caused by rotating the detected lens in an optical axis direction;

calculating a correction value of said deflection from the size of the circle and the shifting direction; and calculating eccentricity between the optical axis and an aspherical surface axis by subtracting the correction value from said deflection measured.

9. A method for measuring eccentricity of an aspherical lens, as claimed in claim 8, wherein the measuring method further comprises the steps of:

displacing the detected lens in a direction approximately perpendicular to the optical axis of the detected lens;

calculating the deflection of the aspherical surface caused by this displacement in the optical axis direction;

calculating a changing amount of the shift between the optical and rotating axes of the detected lens; and calculating said correction value by using a ratio of the changing amount of the shift and an amount of said deflection.

10. A method for measuring eccentricity of an aspherical lens, as claimed in claim 8, wherein the eccentricity of the aspherical surface is corrected by calculating the deflection of the aspherical surface in the optical axis direction from a shape parameter of the detected lens when an angle between the optical and rotating axes of the detected lens is changed by $\phi$.

11. An apparatus for measuring eccentricity of an aspherical lens, comprising:

means for holding a detected lens having an aspherical surface on only one lens face;

driving means for rotating the holding means around a rotating axis approximately conforming to an optical axis of the detected lens;

an angle sensor for detecting a rotating angle of the detected lens;

a light source for irradiating light to the detected lens in a rotating axis direction;

an optical system for focusing and forming reflected light from the detected lens as a spot image;

means for detecting a position of the spot image and arranged in an image forming position of the optical system;

displacement measuring means for measuring the deflection of a detected face of the detected lens in an optical axis direction; and arithmetic means for calculating a correction value with respect to a deflecting value measured by said displacement measuring means from a shift between the rotating axis and the optical axis of the detected lens and a direction of said shift detected by the spot position detecting means and the angle sensor.

12. An apparatus for measuring eccentricity of an aspherical lens, as claimed in claim 11, wherein the measuring apparatus further comprises an actuator for moving the detected lens forward and backward in a direction approximately perpendicular to the optical axis of the detected lens.

13. An apparatus for measuring eccentricity of an aspherical lens, as claimed in claim 12, wherein the actuator displaces the detected lens by the correction value calculated by the arithmetic means in the direction approximately perpendicular to the optical axis of the detected lens in cooperation with the arithmetic means, the displacement measuring means and the actuator.

* * * * *